United States Patent [19]
Orthman

[11] 4,184,551
[45] Jan. 22, 1980

[54] STEERING DEVICE FOR ROW CROP CULTIVATOR

[75] Inventor: Henry K. Orthman, Lexington, Nebr.

[73] Assignee: Orthman Manufacturing, Inc., Lexington, Nebr.

[21] Appl. No.: 851,937

[22] Filed: Nov. 16, 1977

[51] Int. Cl.² .................. A01B 69/06; A01B 79/00
[52] U.S. Cl. ................................. 172/26; 172/190
[58] Field of Search ............ 172/5, 6, 23, 26, 38, 172/190, 191, 574, 576, 624, 626, 664, 665, 668, 166, 288, 289, .1; 104/224.1; 180/79, 131

[56] References Cited

U.S. PATENT DOCUMENTS

| | | | |
|---|---|---|---|
| 3,287,835 | 11/1966 | Waterson | 172/5 X |
| 3,477,516 | 11/1969 | Sweet | 172/190 X |
| 3,512,587 | 5/1970 | Shader | 172/6 X |
| 3,765,501 | 10/1973 | Burvee | 180/131 |

FOREIGN PATENT DOCUMENTS

| | | | |
|---|---|---|---|
| 618483 | 10/1952 | United Kingdom | 172/5 |
| 877499 | 9/1961 | United Kingdom | 172/190 |
| 1416674 | 12/1975 | United Kingdom | 172/26 |
| 1425317 | 2/1976 | United Kingdom | 172/5 |
| 1426549 | 3/1976 | United Kingdom | 172/6 |
| 536769 | 12/1976 | U.S.S.R. | 172/190 |

*Primary Examiner*—Richard T. Stouffer
*Attorney, Agent, or Firm*—Zarley, McKee, Thomte, Voorhees & Sease

[57] ABSTRACT

A precision steering apparatus, affixed to the tool bar of a row crop cultivator, includes a pair of transversely spaced and pivotally mounted coulter discs and a steering mechanism for pivotally moving the coulter discs in unison. A furrow follower mechanism detects lateral drifting of the cultivator implement relative to a guide furrow formed in the ground parallel to the rows of crops. The furrow follower mechanism is operatively connected to a power assist apparatus actuatable to pivot the guide coulters and thereby steer the implement back to its correct transverse position relative to the guide furrow.

15 Claims, 9 Drawing Figures

U.S. Patent  Jan. 22, 1980  Sheet 1 of 2  4,184,551
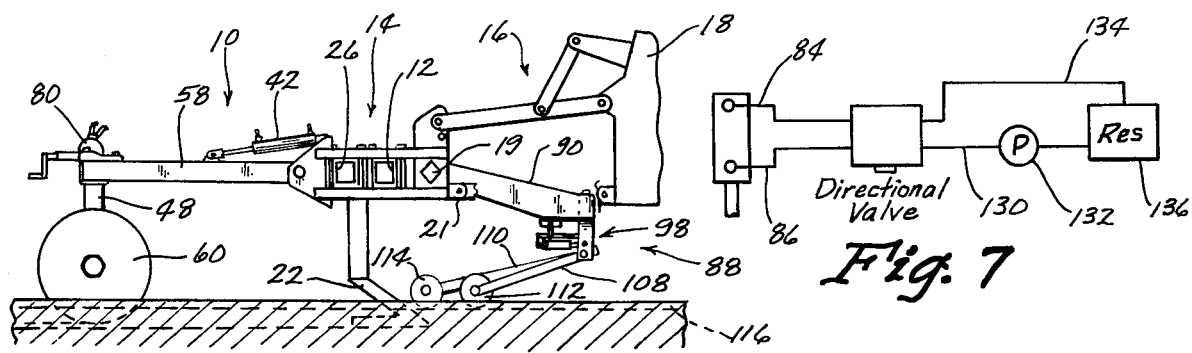
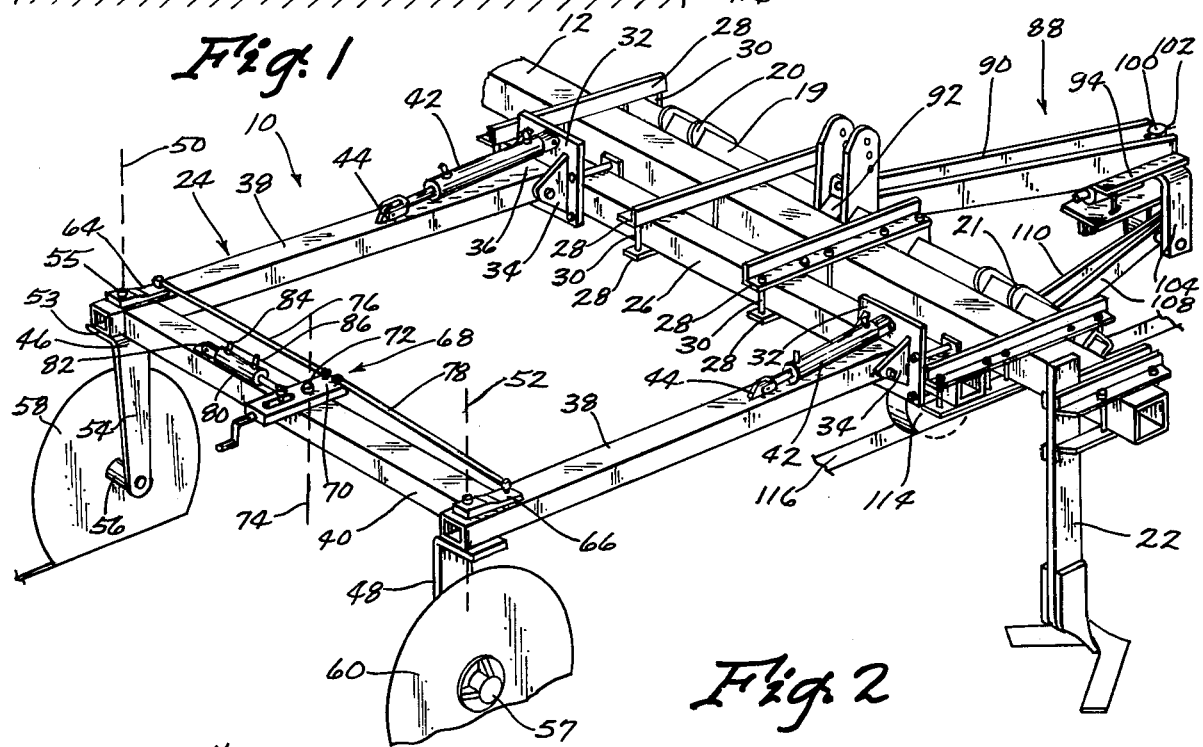
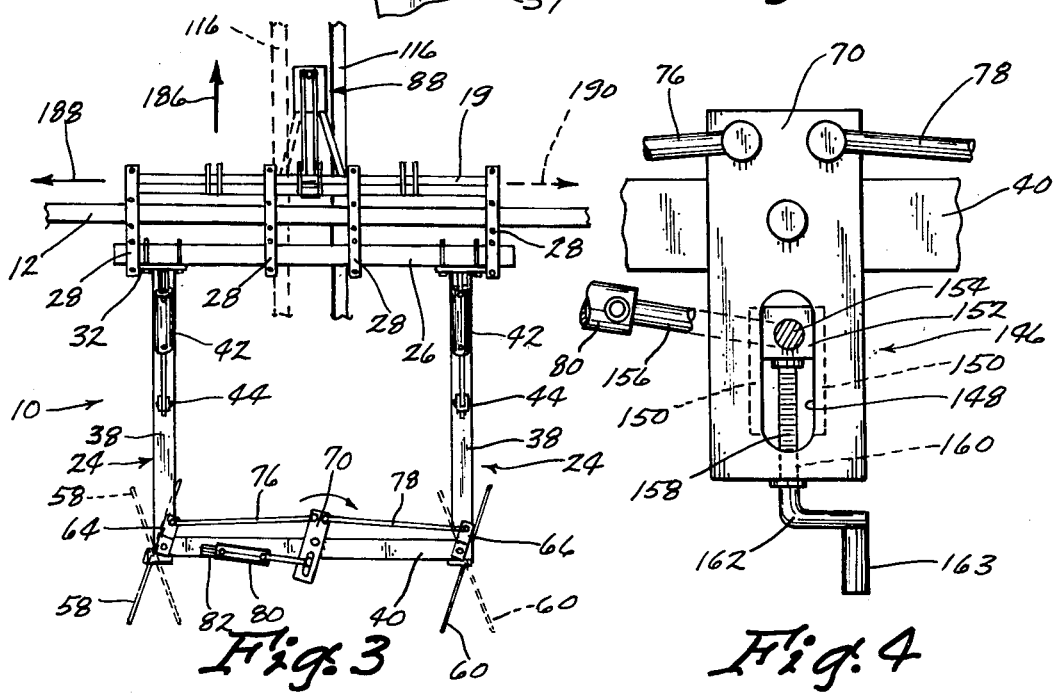

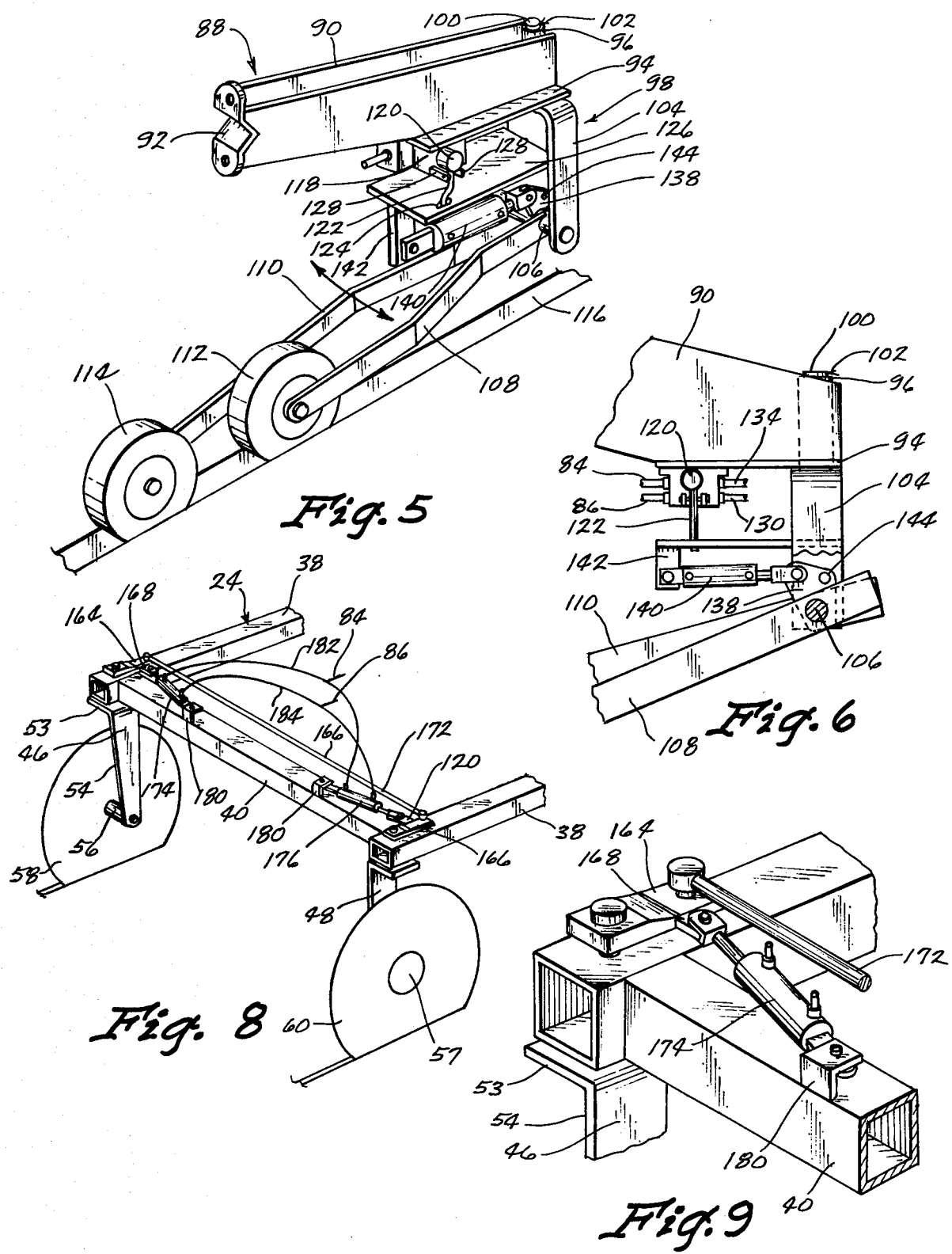

STEERING DEVICE FOR ROW CROP CULTIVATOR

BACKGROUND AND SUMMARY OF THE INVENTION

The present invention relates to a steering device for a row crop cultivator and more particularly to a steerable coulter disc on the tool bar of a hitch mounted implement and means responsive to drifting movement of the tool bar transversely of the crop rows for steering the coulter disc to limit such drift and to move the tool bar back to its intended working position.

There is seen in modern farming practice a growing trend toward the use of larger and wider farm implements adapted to be pulled by the largest and most powerful of the tractors presently being produced. Many of the four wheel drive articulating type tractors, in particular, are capable of pulling planter implements adapted for planting up to twelve or sixteen rows at a time. Corresponding twelve and sixteen-row cultivator implements are available for such tractors.

With the advent of the longer tool bars associated with the wider implements, there is a need for more sophisticated means of steering the implements. The tool bar, which is mounted on the three point hitch of the tractor, may carry ground working tools spaced as close as four inches apart over the even row on twelve-row and larger machines. The tractor operator is generally situated in a cab located several feet above and forwardly of the tool bar such that the working engagement of the tools with the ground is not visible to him. All the operator can do is to attempt to keep the tractor centered relative to the rows. The problem of maintaining the ground working tools between the rows is even more critical with the articulating type tractors wherein the rear axle may tend to pivot relative to the front axle during normal steering of the tractor. Such pivotal movement may laterally shift the tool bar to the extent that the tools are moved into the crop rows. Accordingly, substantial crop loss is risked with each cultivating operation.

It is an object of the present invention to minimize and compensate for lateral shifting of the tool bar by providing a steering apparatus for a row crop cultivator which is capable of stabilizing the rear axle of the towing tractor by absorbing transverse pressure exerted by the tractor rear axle and centering the tractor to correct any lateral drift caused by such pressures.

Another object of the invention is to provide a steering apparatus for a hitch mounted implement which is automatically responsive to transverse drifting movement of the tool bar to correctively steer the implement back to a working position wherein the ground working tools are centered between the crop rows.

A further object of the invention is to provide a steering apparatus which includes a mechanism for following a guide furrow formed by a row marker on the planter implement and signaling any lateral displacement of the tool bar relative to the guide furrow.

A further object of the invention is to provide a steering apparatus which is vertically adjustable with respect to the tool bar so that the coulter discs associated with the steering apparatus may be maintained at a uniform depth in the ground for various working depths of the tools.

A further object of the invention is to provide a steering apparatus which is adjustable to increase or decrease the corrective steering of the coulter discs in response to a fixed transverse displacement of the tool bar.

A further object of the invention is to provide a steering apparatus which is economical to manufacture, durable in use and efficient in operation.

These and other objects of the present invention will be apparent to those skilled in the art.

BRIEF DESCRIPTION OF THE DRAWINGS

FIG. 1 is a side elevational view of the steering apparatus of the invention installed on a hitch mounted cultivator implement;

FIG. 2 is an enlarged perspective view of the steering apparatus in assembly relation with the tool bar of a cultivator implement;

FIG. 3 is a top plan view of the steering apparatus showing the pivotal movement of the coulter discs responsive to transverse movement of the tool bar in either direction;

FIG. 4 is an enlarged detail plan view of the adjustment fixture for the steering apparatus;

FIG. 5 is an enlarged perspective view of the furrow following mechanism of the invention;

FIG. 6 is a detailed side view of a forward portion of the furrow following mechanism showing a cam assembly for raising the finder wheels to an elevated transport position;

FIG. 7 is a hydraulic circuit diagram for the steering apparatus of the invention;

FIG. 8 is a partial perspective view of an alternate embodiment of the steering mechanism for the coulter discs; and FIG. 9 is an enlarged detail perspective view of the steering mechanism of FIG. 8.

DETAILED DESCRIPTION OF THE PREFERRED EMBODIMENTS

The steering apparatus of the present invention, indicated generally at 10 in FIGS. 1 and 2, is shown in assembly relation with an elongated tool bar 12 of a row crop cultivator implement, indicated generally at 14. The tool bar 12 is supported on the three point hitch 16 of a tractor 18 by hitch means including a hitch bar 19 supported forwardly of and parallel to the tool bar, which hitch bar supports the upper and lower hitch pin brackets 20 and 21 which are adapted for attachment to the tractor three point hitch 16. The tool bar 12 is adapted for carrying a plurality of tools such as the cultivator tool 22 shown in FIG. 2 in spaced relation therealong for working the ground between rows of crops. The combination of the hitch bar 19, tool bar 12 and ground working tools 22 is of course old in the art.

The present invention is directed to the apparatus 10 for stabilizing and steering the hitch mounted implement 14. The steering apparatus includes a frame 24 having a base frame portion or front cross member 26 rigidly connected to the tool bar 12 by four pairs of angle iron brace plates 28 which are clamped onto the tool bar 12 and front cross member 26 by longitudinally spaced bolts 30. A pair of tranversely spaced upright hinge plates 32 are rigidly clamped onto the rear face of the front cross member 26. Each hinge plate has a pair of rearwardly extended ears 34 for pivotally supporting the forward end 36 of a rearwardly extended arm 38 for up and down pivotal movement of the opposite end thereof. A cross member 40 is rigidly connected to and extended between the arms 38. A pair of hydraulic cylinder units 42 are connected between the hinge plates 32 and brackets 44 on the arms 38 for pivotally raising and lowering the frame 24 relative to the tool bar 12.

First and second coulter mounting members or forks 46 and 48 are pivotally connected to respective arms 38 adjacent the rearward ends thereof for pivotal movement about respective first and second generally upright axes, indicated at 50 and 52. Since the right fork 48 is constructed as the mirror image of the left fork 46, left fork 46 will be described in detail with like numbers referring to like parts of each.

Thus, the left fork 46 includes an inverted L-shaped member having an upper horizontal leg 53 and a depending upright leg 54. An upright pivot shaft or king pin 55 is secured to the upper horizontal leg 53 of each fork 46 and 48 for receipt within respective generally vertical bores through respective rear end portions of the frame arms 38.

A stub shaft 56 extends transversely from the lower end of the upright leg 54 in the same direction as the horizontal leg 54 for rotatably supporting an automotive type wheel hub 57.

First and second ground engaging coulter discs 58 and 60, respectively, are secured to the wheel hubs 57 for rotation therewith on the stub shafts 56. The coulter discs are preferably of large diameter, a 27 inch by 0.250 inch disc being suitable for the cultivator implement shown. The one arm fork type mounting members 46 and 48 serve to center the coulter discs 58 and 60 directly below the respective king pins 55 and also to provide crop clearance under the frame 24.

A steering means for the first and second guide coulters 58 and 60 includes first and second steering arms 64 and 66 secured to the respective king pins 55 above the frame arms 38. The first and second steering arms 64 and 66 are directed parallel to the first and second coulter discs 58 and 60 for pivotal steering movement therewith.

To maintain the first and second coulter discs 58 and 60 in parallel relation to one another and to steer the discs in unison, a linkage indicated generally at 68 is connected to and extended between the forward ends of the first and second steering arms 64 and 66, as shown best in FIGS. 2 and 3. Linkage 68 includes a rocker arm 70 pivotally connected to the frame cross member 40 by a pivot pin 72 for pivotal movement of the rocker arm 70 about a rocker arm pivot axis indicated at 74. First and second tie rods 76 and 78 are pivotally connected between the forward end of the rocker arm 70 and the steering arms 64 and 66 respectively so that the steering arms and associated coulter discs are pivotally moved in unison in response to pivotal movement of the rocker arm 70.

To pivot the rocker arm 70 about the pin 72, an extendible and retractable hydraulic cylinder unit 80 is connected between the rocker arm 70 and an upstanding bracket 82 on the frame cross member 40 situated transversely of the pivot pin 72. The chambers at opposite ends of the double acting hydraulic cylinder unit 80 are connected by hydraulic lines 84 and 86 through a valve means described hereinbelow to the tractor hydraulic system.

Actuation of the hydraulic cylinder 80 is controlled by a row marker finder or furrow follower mechanism indicated at 88 in FIGS. 2 and 5. The mechanism 88 includes an elongated support arm 90 secured at its rearward end centrally of the tranverse hitch bar 19 by a clamp converter 92. A mounting plate 94 which is welded to the underside of a forward portion of the support arm 90 has a bore through a forward portion thereof at a position aligned with an upright cylindrical fork receiving collar 96 welded onto the upper side of mounting plate 94.

A depending pivot member or fork 98 has an upright stem 100 pivotally received within the collar 96 and axially retained therein such as by cotter pin 102. The fork 98 has a pair of spaced-apart depending legs 104, the lower ends of which are connected by a pivot shaft 106.

A pair of drag links 108 and 110 are pivotally connected at their forward ends to the pivot shaft 106 for independent vertical movement of the opposite ends thereof. The drag links 108 and 110 extend rearwardly from the pivot shaft 106 in transversely spaced relation and each supports a respective finder wheel 112 and 114 at opposite sides of their rearward ends so that the finder wheels 112 and 114 are longitudinally aligned. The finder wheels are thus adapted to follow a guide furrow 116 formed in the ground parallel to the rows of crops. The wheels are preferably small diameter, solid iron wheels as these will follow a relatively small furrow such as one made by a row marker disc or cultivator shovel.

Thus, so long as the tool bar is situated so that the fork 98 is positioned directly above the guide furrow 116, the drag links 108 and 110 are arranged longitudinally parallel to the guide furrow and support arm 90. Movement of the tool bar 12 and fork 98 transversely of the guide furrow 116 however, effects a rotation of the fork 98 since the drag links 108 and 110 become inclined or non-parallel to the guide furrow 116. Fork 98 will, of course, be rotated to a greater or lesser degree depending on the extent of its transverse displacement from the guide furrow 116.

To detect pivotal movement of fork 98 and thus transverse drifting of tool bar 12, the furrow follower mechanism 88 includes a hydraulic valve 118 secured to the underside of the mounting plate 94 on support arm 90. The valve has a transversely movable spool 120 which is actuated by a depending spool lever 122, the lower end of which is received in a slot 124 in a generally horizontal plate 126 which forms part of the fork weldment 98. As shown best in FIG. 5, a medial portion of the spool lever 122 is pivotally secured between a pair of transverse ears 128 situated below the valve spool 120. Accordingly, transverse pivotal movement of the plate 126 in one direction effects a movement of the valve spool 120 in the opposite direction.

Referring to FIG. 7, hydraulic valve 118 is connected by a fluid supply line 130 to the pump 132 of the tractor hydraulic system and is connected by a fluid return line 134 to the reservoir 136 of the tractor hydraulic system. The valve spool 120 is operative in response to rotation of the fork weldment 98 to direct pressurized hydraulic fluid to one end or the other of the hydraulic cylinder unit 80 through the hydraulic lines 84 and 86 (FIGS. 6 and 7) depending upon the direction of rotation of the fork weldment 98.

It can also be seen in FIG. 6 that provision is made for raising the drag links 108 and 110 to an elevated position wherein the finder wheels 112 and 114 are disposed in a clearance relation with the ground for turning and transporting of the implement 14. For this purpose, a cam 138 is fixed onto the pivot shaft 106 and connected by a hydraulic cylinder 140 to a bracket 142 on the underside of the horizontal fork plate 126. A push pin 144 extends transversely from both sides of the cam 138 for engagement with the forward ends of the drag links 108 and 110 when the hydraulic cylinder 140 is extended. Thus, a downwardly pivotal movement of the push pin 144 against the forward ends of the drag links 108 and 110 effects a raising of the finder wheels 112 and 114 on the opposite ends of the drag links. Upon retraction of the hydraulic cylinder 140, the finder wheels are returned to ground engagement by the action of gravity and the drag links 108 and 110 are again independently pivoted on the pivot shaft 106.

Provision is also made for adjustment of the degree of steering of the guide coulters 58 and 60 relative to a given lateral or transverse displacement of the tool bar 12 and fork weldment 98 relative to the guide furrow 116. This is accomplished by an adjustment fixture 146 incorporated into the rocker arm 70 and constituting the connector means between the rocker arm 70 and hydraulic cylinder unit 80. Adjustment fixture 146 includes a slot 148 formed longitudinally in the rocker arm 70 and radially of the rocker arm pivot axis 74, as seen in FIG. 4. Both longitudinal side walls of slot 148 are channeled as at 150 for slideably retaining a connector block 152 within the slot 148. An upstanding connector 154 on block 152 is pivotally connected to the piston rod 156 of the hydraulic cylinder unit 80.

To fix the longitudinal position of connector block 152 within the rocker arm slot 148, a threaded shaft 158 is screwed through a tapped hole 160 through the end of the rocker arm 70 and rotatably fastened to one side of the connector block 152. The opposite or outer end 162 of shaft 158 is offset or bent 90° with respect to the threaded inner portion, with a crank handle 163 rotatably connected to the terminal end thereof for adjusting the shaft 158 and connector block 152 longitudinally of the slot 148. Thus it can be seen that movement of the connector block 152 longitudinally of slot 148 effects a movement of the hydraulic cylinder unit connector 154 radially toward and away from the rock arm pivot axis 74.

An alternate embodiment of the steering linkage and hydraulic cylinder means is shown in FIGS. 8 and 9. The rear portion of the frame 24 is identical to its showing in FIG. 2. Likewise, the coulter mounting forks 46 and 48 and the coulter discs 58 and 60 are unchanged from their showing in FIG. 2. But the steering arms 164 and 166, although otherwise similar to the corresponding arms 64 and 66 in FIG. 2, each have an added flange 168 and 170, respectively, extended transversely inwardly adjacent the free end of the respective arm. In addition, a single continuous linkage 172 is pivotally connected to and extended between the free ends of the steering arms 164 and 166.

Power for steering the coulter discs is provided by a pair of hydraulic cylinder units 174 and 176 connected between the steering arm flanges 168 and 170 and suitable brackets 180 on the frame cross member 40.

The hydraulic lines 84 and 86 from the valve 118 of the furrow follower mechanism 88 are connected to the hydraulic cylinder units 174 and 176 through hydraulic connector lines 182 and 184 so that cylinder unit 174 is extended when cylinder unit 176 is retracted and vice versa. Thus both cylinder units 174 and 176 cooperate to steer the coulter discs 58 and 60 in unison.

In operation, the steering apparatus 10 of the present invention is adapted to be permanently mounted on the tool bar 12 of a row crop implement. For transport to a working location, the finder wheels 112 and 114 are raised to ground clearance position by extension of the hydraulic cylinder 140 on the furrow follower mechanism 88. Upon approaching the field, the operator will observe a small slot or furrow 116 formed in the soil between certain rows by a narrow V-rimmed wheel or chisel type ground cultivating tool that was attached to the planter. The guide furrow 116 is always parallel to the seeded rows because it is formed as the crop is planted. One guide furrow is needed for each pass through the field, i.e., one furrow every twelve rows for a twelve-row cultivator. Means may be provided on the steering apparatus for reforming the guide furrow after each cultivation.

The tractor is then advanced to pull the implement through the field parallel with the crop rows and with the tool bar 12 transversely situated so that the fork 98 of the furrow follower mechanism 88 is situated directly above the guide furrow 116. Hydraulic cylinder 140 is then retracted to lower the finder wheels 112 and 114 into the furrow 116. The furrow follower mechanism 88 is situated on the implement 14 so that when the ground working tools 22 are centered between the crop rows and the finder wheels 112 and 114 are situated within the guide furrow 116, the drag links 108 and 110 are arranged exactly parallel to the crop rows as are the first and second coulter discs 58 and 60. As the implement is advanced, any deviation of the tool bar 12 from side to side will move the fork 98 off the center line of the guide furrow. Since the finder wheels 112 and 114 remain in the furrow, this sidewise movement causes a rotation of the fork weldment 98 and a transverse movement of the fork plate 126 which operates spool valve 118 to regulate the flow of oil to the steering cylinder unit 80. The resultant extension or retraction of the hydraulic cylinder unit 80 effects a pivotal movement of the rocker arm 70 which, in turn, steers the coulter discs 58 and 60 away from their straight ahead positions to correct the error and put the implement back on the center of the row.

Referring to FIG. 3, it will be seen that as the implement is advanced in the direction of arrow 186, any transverse drifting of the implement in the direction of the solid line arrow 188 will effect a pivotal movement of the drag links 108 and 110 to the right as seen in FIG. 3 and thus operate spool valve 118 to effect a retraction of the steering cylinder unit 80 for a clockwise steering movement of the rocker arm 70 and coulter discs 58 and 60. Likewise, transverse drifting movement of the implement in the direction of the dotted line arrow 190 effects a counterclockwise steering movement of the coulter discs 58 and 60 as seen in FIG. 3 for corrective lateral movement of the tool bar in a direction opposite to arrow 190.

The steerable coulter discs of the present invention function somewhat like the rudder of a boat to stabilize the rear axle of the tractor. Accordingly, steering of an articulating type tractor will then result in changing only the angle of the front axle in relation to a course parallel with the crop rows. The coulter discs serve both to take side pressure to prevent lateral drifting of the implement and to center the implement to compensate for whatever lateral drifting does occur. A single coulter may be used on smaller implements and the double coulters, as shown, on larger implements.

The large diameter coulter discs provide a large surface area in contact with the ground to counteract side thrust loads normally encountered in various terrain and soil types. The hydraulic cylinder units 42 on the frame arms 38 provide a vertical adjustment of the coulter discs relative to the tool bar so that the coulter discs may be adjusted to penetrate the ground to a uniform depth for various working depths of the ground working tools.

Thus it is seen that the steering apparatus of the present invention accomplishes at least all of its stated objects.

I claim:

1. A steering apparatus for a row crop implement including an elongated tool bar adapted to be arranged transversely of the crop rows, hitch means connected to the tool bar for connection of the tool bar to a prime mover, and a plurality of tools carried on the tool bar in spaced apart relation for working the ground between the crop rows, said steering apparatus adapted to maintain said implement in a working position in fixed lateral relation to said crop rows and comprising:

a first coulter disc,
   a first coulter mounting member operatively connected to the tool bar for pivotal movement about a first generally upright axis, said first coulter disc mounted on the first coulter mounting member for rotation about a first generally horizontal axis,
   row follower means operatively connected to the tool bar and actuated in response to transverse movement of the tool bar relative to said working position, said row follower means being operative to follow said crop rows independently of transverse movements of the tool bar and prime mover relative to said crop rows,
   steering means responsive to actuation of the row follower means, for pivoting said first coulter mounting member, thereby to steer the first coulter disc for corrective lateral movement of the tool bar to said working position, and
   adjustment fixture means for increasing and decreasing the relative pivotal movement of the first coulter mounting member responsive to actuation of the row follower means.

2. The steering apparatus according to claim 1 comprising:

a second coulter disc,
   a second coulter mounting member operatively connected to the tool bar for pivotal movement about a second generally upright axis spaced transversely of the first upright axis, said second coulter disc mounted on said second coulter mounting member for rotation about a second generally horizontal axis, and linkage means interconnecting said first and second coulter mounting members for pivotal movement in unison.

3. The steering apparatus according to claim 1, including:

means for vertically adjusting the first coulter disc relative to the tool bar.

4. The steering apparatus according to claim 1 wherein the steering means includes:

a rocker arm associated with the first coulter mounting member for pivotal movement therewith,
   an extendible and retractable hydraulic cylinder unit operatively connected at one end to the tool bar and at the other end to said rocker arm, and
   means responsive to actuation of the row follower means for extending and retracting the hydraulic cylinder unit, thereby to steer the first coulter disc.

5. A steering apparatus for a row crop implement including an elongated tool bar extended transversely of the rows of crops and adapted for carrying a plurality of tools in transversely spaced relation thereon for working the ground between the crop rows, and hitch means connected to the tool bar, said steering apparatus adapted to follow a guide furrow formed in the ground parallel to the rows of crops and comprising:

a pair of coulter mounting members,
   means operatively connecting the coulter mounting members to the tool bar in transversely spaced relation for pivotal movement about respective upright axes including,
      a base frame portion rigidly connected to the tool bar,
      a pair of rearwardly extended arms, each pivotally connected at one end to the base frame portion for up and down pivotal movement of the opposite end thereof, and
      a cross member rigidly connected to and extended between the arms,
      said coulter mounting members being pivotally connected to said frame,
   a ground engaging guide coulter rotatably carried on each coulter mounting member,
   a steering arm operatively connected to each coulter mounting member for pivotal movement therewith,
   a linkage pivotally connected to and extended between the steering arms such that the guide coulters are maintained in parallel relation and steerable unison in response to movement of the linkage transversely of the tool bar,
   power assist means operatively connected to the linkage and actuatable to move the linkage transversely of the tool bar,
   furrow follower means operatively carried on the tool bar above the guide furrow and actuatable in response to transverse movement of the tool bar relative to the guide furrow in one direction, and
   means responsive to actuation of the furrow follower means for actuating the power assist means to steer the guide coulters for corrective lateral movement of the tool bar in the opposite direction.

6. The steering apparatus according to claim 5 including means for adjustably fixing the pivoted position of the said arms relative to the base frame portion.

7. A steering apparatus for a row crop implement including an elongated tool bar adapted to be arranged transversely of the crop rows, hitch means connected to the tool bar and a plurality of tools carried on the tool bar in spaced apart relation for working the ground between the crop rows, said steering apparatus comprising:

a first coulter disc,
   a first coulter mounting member operatively connected to the tool bar for pivotal movement about a first generally upright axis, said first coulter disc mounted on the first coulter mounting member for rotation about a first generally horizontal axis,
   row follower means operatively connected to the tool bar and actuated in response to movement of the tool bar transversely of the crop rows in one direction, and
   steering means, responsive to actuation of the row follower means, for pivoting said first coulter mounting member, thereby to steer the first coulter disc for corrective lateral movement of the tool bar in the opposite direction, said row follower means including
pivot member operatively connected to the tool bar for pivotal movement about an upright pivot member axis,
a rearwardly extended drag link connected at its forward end to the pivot member for pivotal movement about a generally horizontal drag link axis,
a ground engageable finder wheel rotatably mounted on a rearward portion of the drag link, and
control means actuated in response to transverse pivotal movement of said drag link.

8. The steering apparatus according to claim 8 comprising a second drag link connected to the depending pivot member for pivotal movement about said drag link axis, a second ground engageable finder wheel rotatably mounted on a rearward portion of the second drag link at a position longitudinally aligned with said finder wheel,
said drag link and second drag link horizontally pivotable in unison with said depending pivot member and independently vertically pivotable about said drag link axis.

9. The steering apparatus according to claim 8 including means for pivotally raising said drag link and second drag link to elevated positions wherein said finder wheels are disposed in a clearance relation with the ground.

10. The steering apparatus according to claim 8 including a row follower support arm rigidly connected to the tool bar and extended forwardly thereof,
said depending pivot member pivotally connected to the support arm at a position such that the finder wheels are disposed forwardly of the tools carried on said tool bar.

11. A steering apparatus for a row crop implement including an elongated tool bar adapted to be arranged transversely of the crop rows, hitch means connected to the tool bar and a plurality of tools carried on the tool bar in spaced apart relation for working the ground between the crop rows, said steering apparatus comprising:
a first coulter disc,
a first coulter mounting member operatively connected to the tool bar for pivotal movement about a first generally upright axis, said first coulter disc mounted on the first coulter mounting member for rotation about a first generally horizontal axis,
row follower means operatively connected to the tool bar and actuated in response to movement of the tool bar transversely of the crop rows in one direction, and
steering means, responsive to actuation of the row follower means, for pivoting said first coulter mounting member, thereby to steer the first coulter disc for corrective lateral movement of the tool bar in the opposite direction,
said steering means including
a rocker arm associated with the first coulter mounting member for pivotal movement therewith,
an extendible and retractable hydraulic cylinder unit operatively connected at one end to the tool bar and at the other end to said rocker arm, and
means responsive to actuation of the row follower means for extending and retracting the hydraulic cylinder unit, thereby to steer the first coulter disc, and
adjustment fixture means for increasing and decreasing the relative pivotal movement of the first coulter mounting member responsive to actuation of the row follower means.

12. The steering apparatus according to claim 11 wherein:
said rocker arm is pivotable about a rocker arm pivot axis, and
said adjustment fixture means includes adjustable connector means connecting the other end of the hydraulic cylinder unit with the rocker arm,
said connector means being adjustable to radially move said other end toward and away from the rocker arm pivot axis.

13. A steering apparatus for a row crop implement including an elongated tool bar extended transversely of the rows of crops and adapted for carrying a plurality of tools in transversely spaced relation thereon for working the ground between the crop rows, and hitch means connected to the tool bar, said steering apparatus adapted to follow a guide furrow formed in the ground parallel to the rows of crops and comprising: a pair of coulter mounting members,
means operatively connecting the coulter mounting members to the tool bar in transversely spaced relation for pivotal movement about respective upright axes,
a ground engaging guide coulter rotatably carried on each coulter mounting member,
a steering arm operatively connected to each coulter mounting member for pivotal movement therewith,
a linkage pivotally connected to and extended between the steering arms such that the guide coulters are maintained in parallel relation and steerable in unison in response to movement of the linkage transversely of the tool bar,
power assist means operatively connected to the linkage and actuatable to move the linkage transversely of the tool bar,
furrow follower means operatively carried on the tool bar above the guide furrow and actuatable in response to transverse movement of the tool bar relative to the guide furrow in one direction, and
means responsive to actuation of the furrow follower means for actuating the power assist means to steer the guide coulters for corrective lateral movement of the tool bar in the opposite direction,
said means operatively connecting the coulter mounting members to the tool bar comprising a frame including:
a base frame portion rigidly connected to the tool bar,
a pair of rearwardly extended arms, each pivotally connected at one end to the base frame portion for up and down pivotal movement of the opposite end thereof, and
a cross member rigidly connected to and extended between the arms,
said coulter mounting members being pivotally connected to said frame, and
said linkage including a rocker arm connected to the frame for pivotal movement about a rocker arm pivot axis and tie rods pivotally connecting the rocker arm to each steering arm whereby the steering arms are pivotally moved in unison in response to pivotal movement of said rocker arm.

14. The steering apparatus according to claim 13 wherein the power assist means comprises an extendible and retractable hydraulic cylinder unit pivotally connected at one end to said frame, and said linkage includes adjustable connector means for connecting the other end of the hydraulic cylinder unit to the rocker arm whereby the rocker arm is pivotally moved in response to extension and retraction of the hydraulic cylinder unit, said connector means adjustable for moving the other end of the hydraulic cylinder unit toward and away from the rocker arm pivot axis.

15. A steering apparatus for a row crop implement including an elongated tool bar adapted to be arranged transversely of the crop rows, hitch means connected to the tool bar and a plurality of tools carried on the tool bar in spaced apart relation for working the ground between the crop rows, said steering apparatus adapted to maintain said implement in a working position in fixed lateral relation to said crop rows and comprising:

a first coulter disc, a first coulter mounting member operatively connected to the tool bar for pivotal movement about a first generally upright axis, said first coulter disc mounted on the first coulter mounting member for rotation about a first generally horizontal axis, row follower means operatively connected to the tool bar and actuated in response to transverse movement of the tool bar relative to said working position, and steering means, responsive to actuation of the row follower means, for pivoting said first coulter mounting member, thereby to steer the first coulter disc for corrective lateral movement of the tool bar to said working position, a second coulter disc, a second coulter mounting member operatively connected to the tool bar for pivotal movement about a second generally upright axis spaced transversely of the first upright axis, said second coulter disc mounted on said second coulter mounting member for rotation about a second generally horizontal axis, and linkage means interconnecting said first and second coulter mounting members for pivotal movement in unison, first and second steering arms operatively connected to the first and second coulter mounting members, respectively, for pivotal movement therewith, said linkage means including a linkage pivotally connected to and extended between the first and second steering arms such that the first and second coulter discs are maintained in parallel relation and steerable in unison in response to movement of the linkage transversely of the tool bar.

* * * * *

UNITED STATES PATENT AND TRADEMARK OFFICE
CERTIFICATE OF CORRECTION

PATENT NO. : 4,184,551
DATED : January 22, 1980
INVENTOR(S) : Henry K. Orthman

It is certified that error appears in the above-identified patent and that said Letters Patent are hereby corrected as shown below:

In claim 8, line 1, change "claim 8" to -- claim 7 --.

Signed and Sealed this

Sixth Day of October 1981

[SEAL]

Attest:

GERALD J. MOSSINGHOFF

*Attesting Officer*     *Commissioner of Patents and Trademarks*